United States Patent [19]
Watson

[11] 4,269,331
[45] May 26, 1981

[54] METERED DISPENSING DEVICE

[76] Inventor: John D. Watson, 906 E. Harmony La., Fullerton, Calif. 92631

[21] Appl. No.: 121,839

[22] Filed: Feb. 15, 1980

[51] Int. Cl.³ .............................................. G01F 11/00
[52] U.S. Cl. ............................... 222/390; 74/424.8 R; 74/527; 411/329
[58] Field of Search ....................... 222/390, 391, 392; 74/424.8 R, 527; 401/172, 175; 85/33; 151/11

[56] References Cited

U.S. PATENT DOCUMENTS

| | | | |
|---|---|---|---|
| 1,391,325 | 9/1921 | Killian | 222/390 |
| 1,644,173 | 10/1927 | Carr | 222/390 |
| 2,745,575 | 5/1956 | Spencer | 222/390 |
| 2,771,113 | 11/1956 | Flora | 151/11 |
| 2,874,877 | 2/1959 | Spencer | 222/390 |
| 2,915,913 | 12/1959 | Molyneux | 74/424.8 R |

*Primary Examiner*—H. Grant Skaggs
*Attorney, Agent, or Firm*—Francis X. LoJacono

[57] ABSTRACT

A dispensing device to meter the discharge of a predetermined amount of a given material, particularly a food product having a thixotropic consistency, wherein a tubular chamber is defined by an elongated housing having a discharge nozzle and a floating piston head disposed in the chamber, the piston head being moved by a threaded shaft which is controlled by a spring-loaded tooth member that allows the shaft to be selectively rotated, causing the piston head to be moved to a predetermined distance, thereby discharging the required amount of material.

2 Claims, 3 Drawing Figures

U.S. Patent May 26, 1981 4,269,331
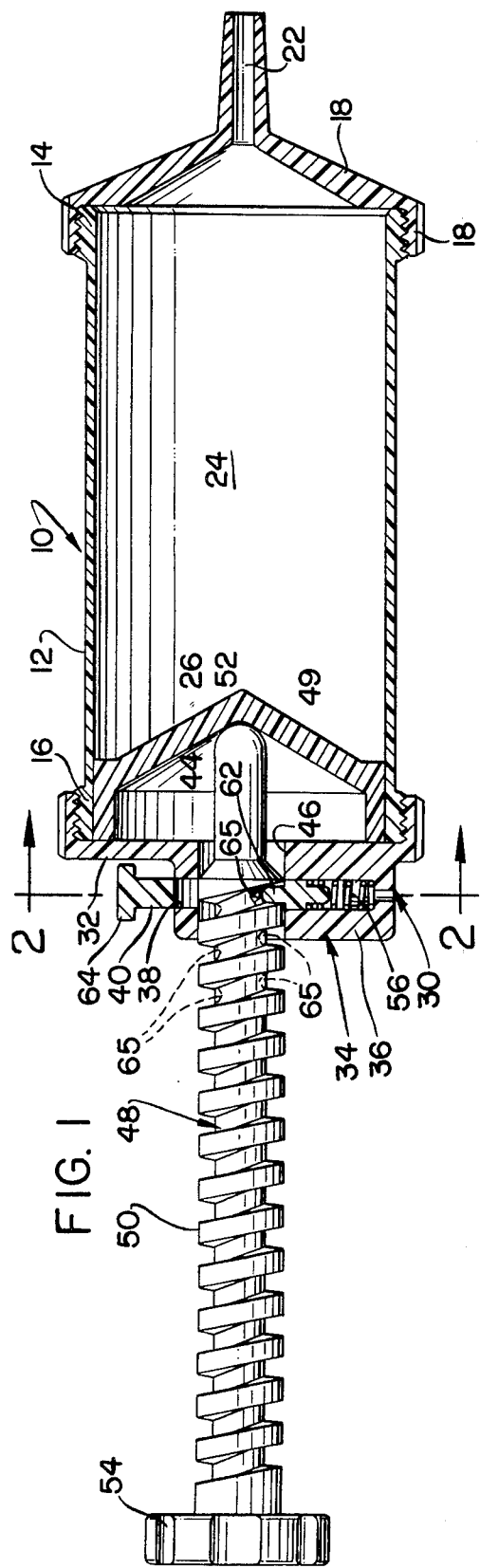
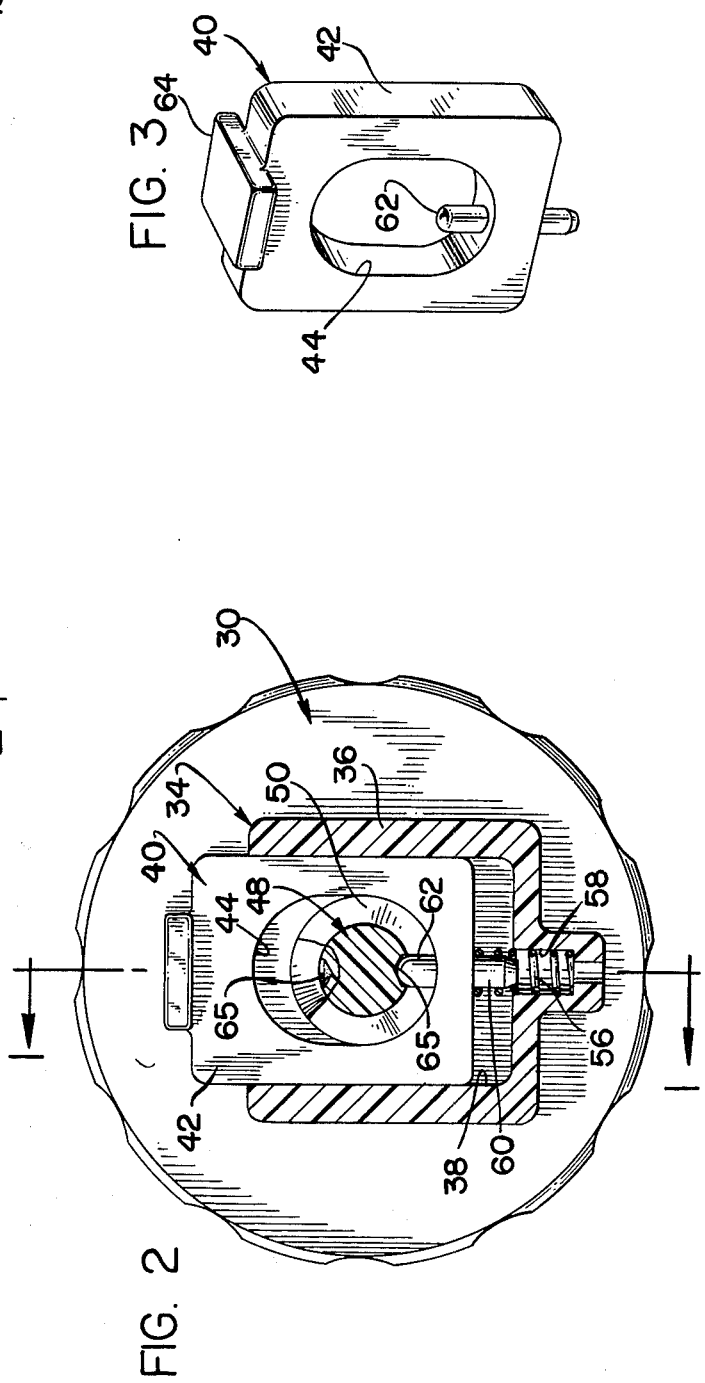

METERED DISPENSING DEVICE

BACKGROUND OF THE INVENTION

1. Field of the Invention

This invention relates generally to a dispensing device, and more particularly to a metered dispensing unit used to dispense a predetermined amount of any soft paste or semi-liquid food product such as sour cream, mayonnaise, ketchup, etc.

2. Description of the Prior Art

As is well known in the art, various problems and difficulties are encountered in providing suitable means for dispensing the proper amounts of food condiments, particularly in the fast-food chains or restaurants.

Various types of dispensing devices have been tried but, because of their complexity, the average worker does not have the skill nor the time to maintain such known devices in working condition.

Due to the fact that these devices are primarily for use with food products, they must be routinely taken apart and cleaned. Therefore, there is the problem of loss of time in disassembling and cleaning large numbers of parts, and then reassembling the devices. Very often the simple process of cleaning a device requires someone with skills not ordinarily found in fast-food outlets.

Thus, there is a growing need to provide a dispensing device of this character that is simple in construction, and that has a minimum of parts, especially moving parts.

SUMMARY OF THE INVENTION

Accordingly, the present invention has been designed to fill this great need. Therefore, an important object of the present invention is to provide a small hand-held dispensing unit that comprises a tubular housing in which the product is disposed, the housing having a simple removable nozzle and a floating piston head. The floating piston head is moved by a threaded shaft, the shaft having a plurality of longitudinally positioned detents, these detents being interposed at the base of the threads so as to receive a spring-biased tooth-pin member that allows the shaft to be selectively rotated, whereby the piston head can only move a predetermined distance—which in turn forces a predetermined amount of product to be discharged from the nozzle member.

Thus, it is another object to provide a shaft member wherein the rotation thereof is selectively controlled in a simple manner by a one-piece rotational control member slidably mounted in the capped end of the housing.

It is still another object of the invention to provide a metered dispenser that can be completely disassembled and cleaned, and then reassembled, without the need for mechanically skilled employees.

It is a further object of the invention to provide a dispenser of this type that has relatively few operating parts, that is easy to service and maintain, and that in particular is simple to operate.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a longitudinal cross-sectional view of the dispenser device taken substantially along line 1—1 of FIG. 2, including the threaded shaft therein;

FIG. 2 is an enlarged cross-sectional view taken substantially along line 2—2 of FIG. 1, showing the position of the rotational control member; and FIG. 3 is a perspective view of the rotational control member.

DESCRIPTION OF THE PREFERRED EMBODIMENT

Referring to the drawings, and more particularly to FIG. 1, there is generally indicated at 10 the present invention defining a metered dispensing device. The metered dispensing device 10 is particularly designed for dispensing food products that have a substantially thixatropic consistency—such as, for example, sour cream, mustard, ketchup and other types of food condiments that are semi-liquid or have the consistency of a soft paste.

The metered dispensing device 10 comprises an elongated tubular housing 12 having externally threaded open ends 14 and 16. Threadably mounted over open end 14 is a removable nozzle member having a threaded outer annular flange 18 integrally formed with a conical wall 20, the apex of which is provided with a discharge passage 22. Thus, various discharge means can be mounted thereon, depending upon the specific product to be dispensed and the associated use thereof.

After the food product is poured into the chamber 24 defined by housing 12, a floating piston head 26 is installed through open end 16. Accordingly, piston head 26 must be moved longitudinally within chamber 24 to force the stored material to be discharged through passage 22.

This is accomplished by providing a cap member 30 which is threadably secured to housing 12, thus covering open end 16. Cap member 30 includes a substantially flat wall 32 which is provided with a rotational release means, generally indicated at 34. Rotational release means 34 comprises a projecting guide member 36 formed having a flat substantially rectangular cavity 38 in which is removably received a release-control member, designated at 40.

Both the body member 42 of the control member 40 and cap member 32 are provided with aligned openings 44 and 46, respectively. These openings allow a longitudinal threaded shaft 48 to be passed into chamber 24, so as to contact and engage the rear of the conical wall 49 of head 26.

Shaft 48 comprises a threaded member 50 having an extended neck member 52 formed at one end thereof and a knob 54 mounted to the opposite end thereof. As the shaft is rotated inwardly through the rotational release means 34, piston head 26 will be forced to move along chamber 24.

After cap 32 is in place, control member 40 is inserted into cavity 38 of guide 36 along with a biasing spring 56 which is positioned in bore 58 at the bottom of guide 36, whereby the spring connects with depending pin 60 formed on the bottom of body 42. Disposed in the opening of body 42 is a latch pin 62 which further defines a gear-tooth member. Thus, control member 40 is pressed downwardly by means of button 64 to a point whereby shaft 48 can freely pass through aligned openings 44 and 46.

Once the shaft is in position, control member 40 is released so as to position gear tooth 62 between the first adjacent threaded members 50, gear tooth 62 being received in one of a series of selectively positioned detents 65, whereby tooth 62 further defines a latch pin.

In order to remove shaft 48, control member 40 is forced inwardly to release latch 62 from detent 65 and threads 50, whereby shaft 48 is free to separate from the dispenser.

Thus, shaft 48 is in a holding position at this time. When shaft 48 is rotated, tooth 62 snaps out of one detent and engages threads 50 during rotation, until tooth 62 becomes engaged with the succeeding detent 65.

As an example, FIGS. 1 and 2 show two rows of longitudinally disposed detents 65, one row being located 180° from the other, providing a half rotation of the shaft for each predetermined discharge. Hence, it can be understood that the number of threads per inch and the sequential arrangement of the detents will establish a given volume of material to be discharged.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A metered dispensing device for thixotropic products, comprising:
    a tubular housing defining a chamber having front and rear open ends;
    a discharge nozzle removably secured to the rear open end;
    a cap member removably secured to the front end;
    a rotational release means mounted to said cap member;
    said rotational release means comprising a guide member formed integrally with said cap member, and a control member slidably received in said guide member;
    wherein said control member comprises a body member having a central opening therein and an inwardly projecting tooth member disposed in said opening;
    said tooth also defining a latching pin;
    a plurality of selectively spaced detents formed in said shaft to receive said latching pin, wherein the placement of said detents determines the amount of product to be discharged from said chamber; and
    a biasing spring positioned between said guide member and said control member, to provide a controlled engagement between said control member and said shaft member;
    a threaded shaft adapted to be removably mounted in said rotational release means for selective rotation thereof; and
    a piston head disposed in said chamber for longitudinal movement therein, and positioned for engagement with said shaft.

2. A metered dispensing device as recited in claim 1, wherein said threaded shaft includes a knob at one end, and an extended neck member for engagement with said piston head.

* * * * *